United States Patent [19]

Wiernicki

[11] 4,300,119
[45] Nov. 10, 1981

[54] POWER GENERATOR FOR TELEMETRY TRANSMITTER

[75] Inventor: Michael V. Wiernicki, Trumansburg, N.Y.

[73] Assignee: Facet Enterprises, Inc., Tulsa, Okla.

[21] Appl. No.: 72,877

[22] Filed: Sep. 6, 1979

[51] Int. Cl.³ .................... B60C 23/02; B60C 23/20; G01P 3/481; G01P 3/488
[52] U.S. Cl. .................... 340/58; 73/146.5; 200/61.22; 324/167; 324/178; 340/62
[58] Field of Search .............. 340/58, 62; 200/61.25, 200/61.22, 61.23; 324/167, 176, 178; 73/146.5, 146.8

[56] References Cited

U.S. PATENT DOCUMENTS

| | | | |
|---|---|---|---|
| 3,708,750 | 1/1973 | Bucks et al. | 324/178 |
| 3,750,128 | 7/1973 | Sapir | 340/62 X |
| 3,760,351 | 9/1973 | Thomas | 340/58 |
| 3,786,413 | 1/1974 | Ross et al. | 340/58 |
| 3,787,806 | 1/1974 | Church | 340/58 |
| 4,048,614 | 9/1977 | Shumway | 340/58 |
| 4,075,603 | 2/1978 | Snyder et al. | 340/58 |
| 4,117,452 | 9/1978 | Snyder et al. | 340/58 |
| 4,160,234 | 7/1979 | Karbo et al. | 200/61.23 X |
| 4,210,898 | 7/1980 | Betts | 73/146.5 X |

Primary Examiner—John W. Caldwell, Sr.
Assistant Examiner—Joseph E. Nowicki
Attorney, Agent, or Firm—Remy J. VanOphem

[57] ABSTRACT

A voltage generator which provides the biasing voltage to a telemetry transmitter positioned inside the tire of a moving vehicle is disclosed. The entire transmitting system, including the antenna, is self-contained within the pneumatic tire; and, accordingly, there is no need for connecting wires of any nature to be extended outside the tire containing the invention. The invention utilizes one of several available types of voltage generators to generate a voltage in response to the rotation of the tire as the vehicle moves within a coil. As is known, as a tire rotates along a road, the tire deflects and flattens along the area which contacts the road. The transducer used in the invention generates a voltage in response to this tire deflection. The voltage thus generated are processed and utilized to provide the biasing voltage for a transmitter. Various measured parameters, such as tire pressure, temperature, inflation, and fatigue can then be provided from appropriately positioned and styled transducers and the measured telemetry signals transmitted by the transmitter to a receiver within the operator's compartment of the vehicle. The invention, therefore, is directed toward a means for providing the biasing voltage to the transmitter without the need for coupling to outside voltage sources or receiving equipment. Additionally, several transducers can be equally spaced around the parameter of the tire to thereby yield a biasing voltage which is more constant and higher in voltage than if a single voltage generator were utilized.

15 Claims, 5 Drawing Figures

POWER GENERATOR FOR TELEMETRY TRANSMITTER

BACKGROUND OF THE INVENTION

It has long been recognized in the art that there is a need to detect parameters which indicate the possibility of the tire failure and also to detect various other parameters which can be used in various vehicular control systems. As an example, the detection of temperature, pressure, and deflation of a tire can indicate that a failure of the tire is pending and, thus, the avoidance of a potentially hazardous or even fatal situation is made possible.

The present invention is also useful in providing signals for various automatic systems frequently used in vehicles. As is known, such parameters as the rotational speed of the tire and the acceleration of the tire are used in automatic speed control systems and in automatic breaking (antiskid) systems respectively. The inventive system can be used to obtain both these signals.

The need for devices which will yield output signals in response to hazardous conditions, such as deflation, has long been recognized in the art, as is evidenced by such patents as U.S. Pat. No. 4,117,452. This patent is exemplary of prior art devices which are utilized to detect the sudden deflation of the tire and to yield an output signal in response to such deflation. This patent also is exemplary of the deficiencies of the prior art because it is limited to the detection of deflation only and does not suggest responsiveness to elevated temperatures and does not suggest a technique for providing a biasing signal to a transmitter and its accompanying circuitry which are totally enclosed within the tire. The various devices presently found in the art are deficient and of very limited utility because they require wires, or other connecting means, running into and out of the tire in order to provide the biasing voltages to the system within the tire and to transport the output signal outside the tire. Also, the rotation of the tire during travel causes severe problems in coupling the transmitter to the biasing voltage source and also to the receiving apparatus which is utilized to receive the fault signal.

The prior art available thus is deficient in that it is void a teaching of a mechanism for providing the required regulated biasing voltages to the transmitters and other electrical apparatus which are contained within the tire. Thus, the prior art devices are responsive to a particular fault but are not useful with transducers which are intentionally placed and arranged to measure predetermined parameters of the tire such as speed, pressure, temperature, fatigue, etc. The prior art is also deficient because it does not show or suggest a system which can be used to transmit detected parameters, such as speed and acceleration.

BRIEF DESCRIPTION OF THE INVENTION

The present invention overcomes the above noted deficiencies of the prior art in that it discloses a system and method for providing the biasing voltage to electronic apparatus which are contained within a pneumatic tire and thus eliminates the need for external wiring from the tire. In the inventive device, one or more power generating elements are positioned inside the tire tread. As is known, as the tire rotates, the portion of the tire which is in contact with the roadway deflects and flattens. This causes flexure points along the tread of the tire as the tire rotates. In the invention, the voltage generators respond to this deflection and generate an output signal in response thereto. Thus, one type of voltage generator which can be used is a piezoelectric crystal which yields an output signal in response to a bending force which it undergoes as it passes through the flexure points of the tire. Accordingly, each time the piezoelectric crystal is subjected to the bending pressure caused by the deflection of the tire, it generates an output voltage. Another type of power generator which can be used is a magnetic element which moves in relationship to an electric coil in response to the deflection of the tire. If desired, several transducers can be equiangularly spaced around the tire so that the total output voltage generated by the various power generators is of a higher level and of a more continuous operation than that of a single generator.

Irrespective of the number of transducers used, the output of the voltage generator is rectified and used as the biasing voltage for a transmitter and any other electrical components contained within the system.

The transmitter can then be used to receive input signals from various transducers which are used to detect and measure various parameters of the tire. Such parameters can be the air pressure within the tire, the temperature of the tire, the inflation of the tire, fatigue characteristics of the tire, etc. The various outputs from the transducers are then amplified by the transmitter and sent via an antenna to an appropriate receiver which is located within the cab of the vehicle. Accordingly, the parameter outputs are available because the biasing voltage for the transmitter is available at all times that the vehicle is in motion but no outside connections to the inventive device are required.

Additionally, the output frequency of the voltage generator, irrespective of whether it is of the piezoelectric or magnetic type, is directly proportional to the rotational speed of the tire and thus to the velocity of the vehicle. For this reason, the output from the voltage generator can be applied to a square wave generator or a frequency generator, the output of which is then directly proportional to the rotational velocity of the tire in which the transducers are mounted. The rotational velocity of the vehicle and, thus, the signal can be used as a direct indication of the speed of the vehicle. The signal, therefore, can be useful in automatic speed control systems and other systems which are dependent upon a velocity proportional signal. Also, the signal can be differentiated to provide the acceleration signal which is necessary for such systems as automatic breaking or antiskid systems. As is known, when a vehicle skids, the accelerations of the various wheels are different. This difference in acceleration can be used to actuate an antiskid system. Thus, differentiation of the unrectified signal from the voltage generators can be used for any purpose requiring an acceleration signal and the undifferentiated signal can be used anywhere a velocity signal is required.

DESCRIPTION OF THE PREFERRED EMBODIMENT

Figure 1:
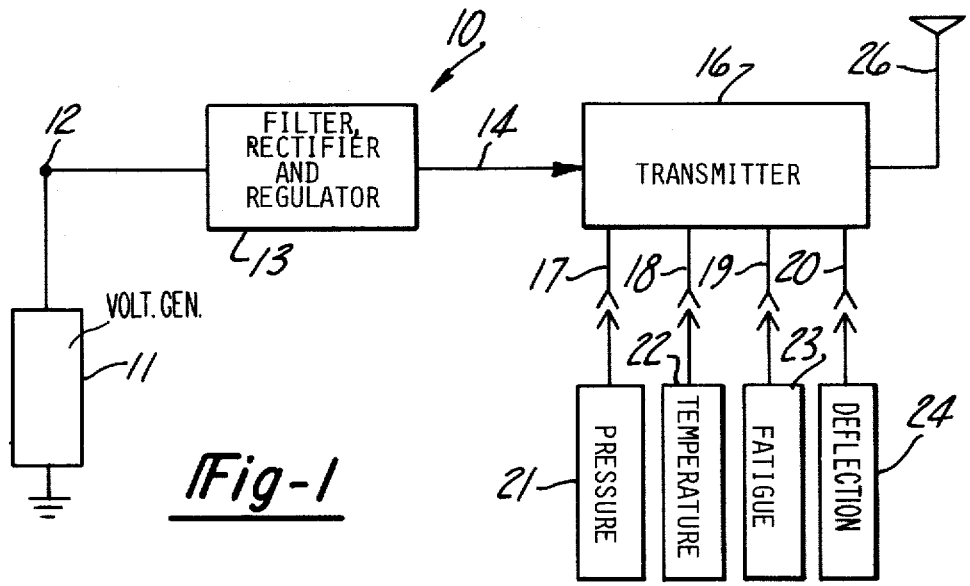
FIG. 1 is a preferred embodiment of the instant invention.

In FIG. 1, the inventive system is generally indicated by reference numeral 10 and includes a voltage generator 11 which provides an output voltage at terminal 12 in response to the deflecture of the tire in which the inventive system is located. The generation of this voltage signal will be described more fully hereinafter with respect to FIGS. 2 and 3. The output voltage from generator 11 is provided through a rectifier and voltage regulator 13 so that the pulsed output voltage from the generator 11 is available as a regulated D.C. voltage on the output lead 14 of regulator 13. This voltage is utilized as the biasing voltage to the transmitter 16. This transmitter 16 can be any standard type of transmitter known in the art and within the preview of those skilled in the art.

Transmitter 16 is shown having a plurality of input leads 17, 18, 19, and 20. Accordingly, the function of a transmitter is to amplify and transmit any input signals available from the leads 17 through 20. Input lead 17 is shown coupled to a pressure transducer 21. The pressure transducer is located inside the pneumatic tire along with the rest of the system which is composed of power generator 11, rectifier 13, transmitter 14, and antenna 26. The pressure transducer 21 provides signals which are indicative of the pressure within the pneumatic tire. Thus, when the tire pressure either decreases indicating an imminent tire failure or increases to a level beyond the strength of the tire, either of which conditions can result in a hazardous set of events, an appropriate output signal is transmitted by the inventive system to a receiver located within the operator's compartment of the moving vehicle.

In similar fashion, input lead 18 is coupled to a temperature transducer 22 which provides a signal indicative of the temperature of the air inside the tire. Accordingly, as dangerous and hazardous temperatures are approached, a warning of this condition is provided to the operator of the vehicle.

In similar fashion, input lead 19 is shown coupled to a fatigue transducer 23, the output of which indicates that the tire is sufficiently old to have suffered fatigue failure and thus is about to fail and potentially present a hazardous condition. Such a condition is indicated by excessive or deficient deflection in the sidewalls of the tire.

Additionally, input lead 20 is coupled to a deflection transducer 24. Accordingly, excessive deflection of the tire in the area where the tire tread contacts the roadway yields an output signal which is conveyed over lead 20 to the transmitter 16 and thus, via antenna 26, to the operator of the vehicle. It will be noted and appreciated by those skilled in the art that the exact nature of the transducers 21 through 24 is within the purview of those skilled in the art and, additionally, if desired, tire parameters other than those described and shown herein can be detected and transmitted to the vehicle operator by way of transmitter 16.

Figure 2:
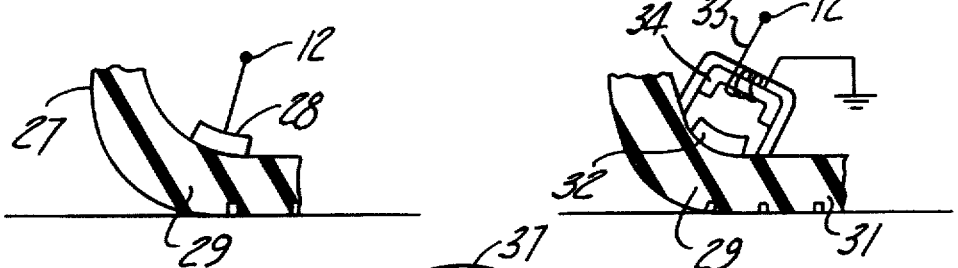
FIG. 2 is a generalized showing of the tire flexure and the bending of a piezoelectric crystal in response to such flexure.

FIG. 2 shows how the transducer is responsive to deflection of a tire 27 as the tire flattens at the area where the tire tread contacts the road surface. In FIG. 2, the voltage generator 11 is a piezoelectric crystal 28. As the tire rolls along the road surface, a flexure area 29 is created. The entire parameter of the tire tread passes through this area which remains stationary with respect to the road. As the piezoelectric crystal 28 passes through the flexure area 29, a bending moment is applied to the piezoelectric crystal 28. During the application of the bending moment, the piezoelectric crystal generates an output signal which persists during the duration of the bending moment. As shown by the commonality of reference number 12 to the output terminal of the piezoelectric crystal in FIGS. 1 and 2, the output voltage signal is applied to the input lead of the rectifier and regulator 13 shown in FIG. 1.

Figure 3:
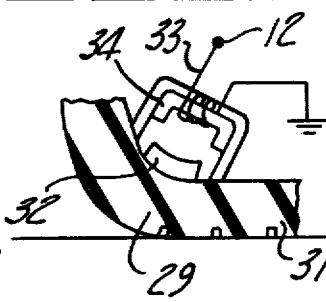
FIG. 3 is a generalized showing of the tire flexure and the generation of a voltage output signal by the movement of a magnet with respect to a coil in response to such flexure.

FIG. 3 also shows a section of a tire 31 including deflection area 29. Positioned inside the tire on the inner surface of the tread is a second embodiment of the voltage generator 11. In this embodiment, the voltage generator includes a magnet 32 which moves at the flexure point 29 to cause the generation of an output signal because of the presence of coil 33 and ferromagnetic element 34.

Here again, the generation of the output voltage signal results in the availability of such output signal on terminal 12 and thus provides an input voltage to the rectifier and regulator 13. It will be noted that the magnetic element 32, as well as the ferromagnetic element 34 and coil 33, are constantly positioned with respect to the center of the tire except in those instances when the voltage generator passes through flexure point 29 of the tire, during such passage the magnet 32 moves with respect to the coil 33 and ferromagnetic element 32 to produce the desired voltage.

Figure 4:
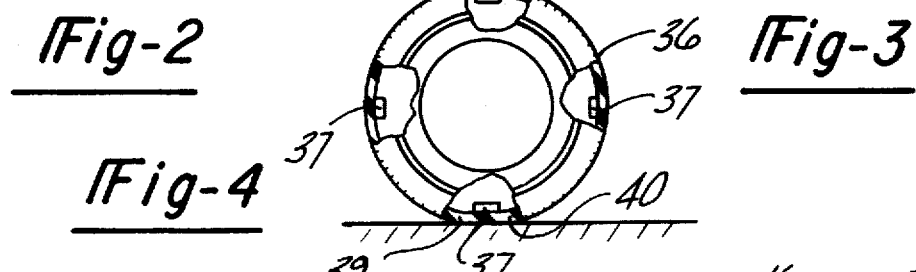
FIG. 4 shows how the tire causes flexure at two places along the tire tread and also the equiangular spacing of a plurality of voltage generators around the interior of the tire.

FIG. 4 shows a complete tire 36 with four voltage generators 37 equally spaced around the inside perimeter of the tire. It should be noted that any number of transducers 37 can be positioned within the tire and that the type of voltage generator 37 can be either a piezoelectric crystal 28 as shown in FIG. 2 or the magnetic type 33 shown in FIG. 3. As shown in FIG. 4, the tire 36 is completely round except in the area 38 where the tire contacts the road surface. For this reason, there are two flexure areas 39 and 40 through which each of the transducers 37 passes as the tire rotates. Accordingly, by utilizing four power generators 37, eight output pulses are generated for each rotation of the tire. That is, each of the voltage generators 37 generates two output voltage pulses during passage through flexure points 39 and 40. Obviously, if a different number of voltage generators 37 are used, the number of output pulses provided will merely be twice the number of voltage generators used. It will also be within the purview of those skilled in the art to recognize the fact that the more voltage generators 37 used, the stronger and more easily filtered will be the output signal applied to the rectifier and regulator 13 shown in FIG. 1.

Figure 5:
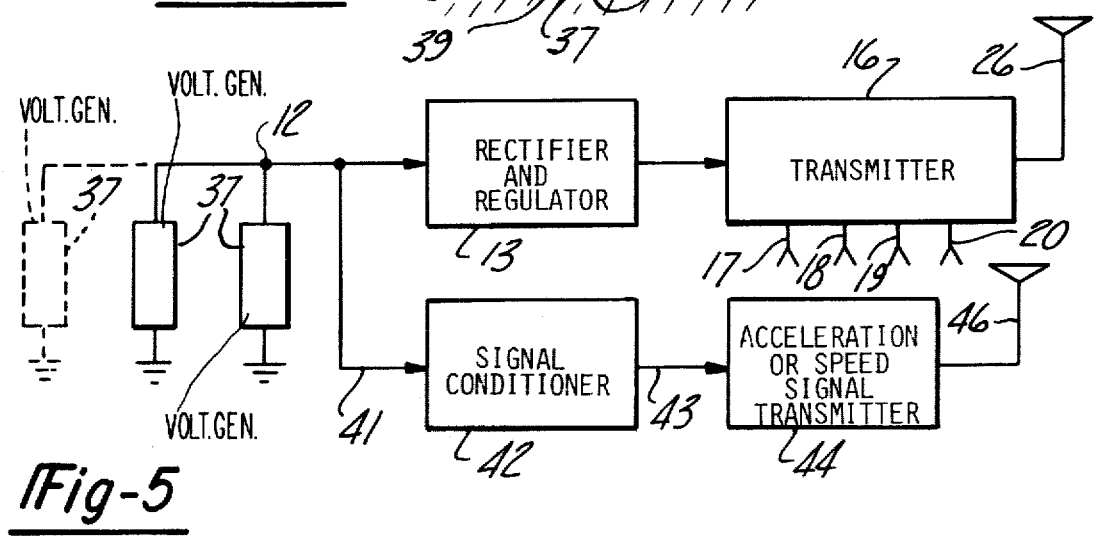
FIG. 5 shows how the preferred embodiment of FIG. 1 can be modified to include a square wave generator or frequency generator the output of which can be utilized as velocity or acceleration proportional signals.

FIG. 5 shows how the plurality of voltage generators 37 is coupled to junction 12 and thus rectifier-and-regulator 13. As shown, the various voltage generators 13 are in parallel and, therefore, an input pulse is available at junction 12 each time one of the several voltage generators 37 passes through either of the flexure points 39 or 40 of FIG. 4.

As indicated by like reference numerals, the elements 12, 13, 16, 17-20, and 26 of FIG. 5 are identical with the corresponding elements of FIG. 1. In addition, in FIG. 5, the output pulses available at Junction 12 are applied through an input lead 41 to a square wave generator or frequency generator 42. Because the number of pulses available on input lead 41 is directly proportional to the rotational speed of the tire 36, the number of pulses available as an input to the generator 42 is directly proportional to the speed of rotation of the wheel. The pulses received from transducer 37 can be converted into a square wave having a pulse repetition frequency directly proportional to the velocity of the vehicle. Alternatively, the voltage pulses can be converted into an A.C. signal, the frequency of which is proportional to the vehicle velocity. In either event, the output generator 42 available on output lead 43, is directly proportional to the speed of the vehicle on which the tire is mounted. This signal is applied to an acceleration or speed signal transmitter 44 and transmitted via antenna 46 to the appropriate receiver positioned within the operator's compartment of the moving vehicle. The speed signal can be used as a direct indication of the velocity of the vehicle and thus can be used for such systems as automatic cruise control systems or can be used as the input to the speedometer of the vehicle. Also, if desired, the speed signal can be differentiated to yield acceleration signals for each individual wheel. Because skidding results in unequal accelerations in the various wheels, the difference in the acceleration signals from the four wheels can be utilized to actuate an antiskid system or an automatic breaking system. Also, if desired, the velocity signal can be integrated to yield a distant signal and thus can be used to actuate the odometer of the vehicle. It will be appreciated by those skilled in the art that the exact nature of the signal conditioner 42 is within the purview of those skilled in the art and any of many presently available in the art can be used for this purpose. This also is true of the acceleration or speed signal transmitter 44.

What I claim is:

1. A system for providing a biasing voltage to an electronic apparatus mounted inside a pneumatic tire independently of couplings outside said pneumatic tire comprising:
   signal generation means, fixedly attached to an internal surface of the pneumatic tire for generating an output voltage each time said pneumatic tire is flexed in the immediate vicinity of said signal generator means;
   means for receiving said output voltage and converting said voltage to a direct current voltage;
   transmitter means responsive to said direct current voltage for generating an output signal;
   at least one transducer means for detecting at least one tire condition parameter to provide at least one measured parameter signal to said transmitter means for transmitting said measured parameter signal as said output signal; and
   antenna means operatively associated with said transmitter means to transmit said output signal.

2. The system of claim 1 wherein the pneumatic tire has a surface engaging portion, said signal generation means is at least one piezoelectric crystal attached to the internal surface of said surface engaging portion.

3. The system of claim 1 wherein the pneumatic tire has a surface engaging portion, said signal generation means is at least one electromagnetic generator attached to the internal surface of said surface engaging portion.

4. The system of claim 2 wherein said piezoelectric crystal undergoes a bending moment each time said pneumatic tire flexes in the immediate vicinity of said piezoelectric crystal during rotation and generates said output voltage during said bending moment.

5. The system of claim 3 wherein said electromagnetic generator provides said output voltage each time said pneumatic tire flexes in the immediate vicinity of said electromagnetic generator.

6. The system of claim 2 wherein said means for receiving is a rectifier-and-regulator circuit.

7. The system of claim 3 wherein said means for receiving is a rectifier-and-regulator circuit.

8. The system of claim 4 wherein said transducer means includes at least two transducers individually responsive to at least two different tire condition parameters.

9. The system of claim 5 wherein said transducer means includes at least two transducers individually responsive to at least two different tire condition parameters.

10. The system of claim 4 wherein said pneumatic tire is rotating and repetitively flexing in the immediate vicinity of said signal generation means at a rate proportional to the rotational velocity of the pneumatic tire, said system further including square wave generation means responsive to the repetitive occurrence of the output voltage from said signal generator means for providing a square wave pulse signal having a pulse repetition frequency directly proportional to the rotational velocity of said rotating tire;
   second transmitter means responsive to said square wave pulse signal to provide an output signal related to said square wave pulse signal; and
   antenna means operatively associated with said second transmitter means for transmitting said output signal.

11. The system of claim 5 wherein said pneumatic tire is rotating and repetitively flexing in the immediate vicinity of said signal generation means at a rate proportional to the rotational velocity of the pneumatic tire, said system further including square wave generation means responsive to the repetitive occurence of the output voltage from said signal generator means for providing a square wave pulse signal having a pulse repetition frequency directly proportional to the rotational velocity of said rotating tire;
   second transmitter means responsive to said square wave pulse signal to provide an output signal related to said square wave pulse signal; and
   antenna means operatively associated with said second transmitter means for transmitting said output signal.

12. The system of claim 4 wherein said pneumatic tire is rotating and repetitively flexing in the immediate vicinity of said signal generation means at a rate proportional to the rotational velocity of the pneumatic tire, said system further including frequency generator means responsive to the repetitive occurrence of the output voltage from said signal generator means for providing a frequency signal having a frequency directly proportional to the rotational velocity of said rotating tire;
   second transmitter means responsive to said frequency signal to provide an output signal related to said frequency signal; and antenna means operatively associated with said second transmitter means for transmitting said output signal.

13. The system of claim 5 wherein said pneumatic tire is rotating and repetitively flexing in the immediate vicinity of said signal generation means at a rate proportional to the rotational velocity of the pneumatic tire, said system further including frequency generator means responsive to the repetitive occurrence of the output voltage from said signal generator means for providing a frequency signal having a frequency directly proportional to the rotational velocity of said rotating tire;

second transmitter means responsive to said frequency signal to provide an output signal related to said frequency signal; and antenna means operatively associated with said second transmitter means for transmitting said output signal.

14. The system of claim 8 wherein said pneumatic tire is rotating and repetitively flexing in the immediate vicinity of said signal generation means at a rate proportional to the rotational rate of said tire, said system further including frequency generator means responsive to the repetitive occurrence of the output voltage from said signal generator means for providing a frequency signal having a frequency directly proportional to the rotational velocity of said rotating tire;

second transmitter means responsive to said frequency signal to provide an output signal related to said frequency signal; and antenna means operatively associated with said second transmitter means for transmitting said output signal.

15. The system of claim 9 wherein said pneumatic tire is rotating and repetitively flexing in the immediate vicinity of said signal generation means at a rate proportional to the rotational rate of said tire, said system further including frequency generator means responsive to the repetitive occurrence of the output voltage from said signal generator means for providing a frequency signal having a frequency directly proportional to the rotational velocity of said rotating tire;

second transmitter means responsive to said frequency signal to provide an output signal related to said frequency signal; and antenna means operatively associated with said second transmitter means for transmitting said output signal.

* * * * *